US008598268B2

(12) United States Patent
Aitken et al.

(10) Patent No.: US 8,598,268 B2
(45) Date of Patent: Dec. 3, 2013

(54) FLAME RETARDANT CABLE JACKET MATERIALS INCLUDING VANADIUM PHOSPHATE

(75) Inventors: Bruce G. Aitken, Corning, NY (US); Linda S. Baker, Addison, NY (US); Atanas V. Gagov, Painted Post, NY (US)

(73) Assignee: Corning Cable Systems LLC, Hickory, NC (US)

( * ) Notice: Subject to any disclaimer, the term of this patent is extended or adjusted under 35 U.S.C. 154(b) by 38 days.

(21) Appl. No.: 13/301,009

(22) Filed: Nov. 21, 2011

(65) Prior Publication Data

US 2012/0130012 A1 May 24, 2012

Related U.S. Application Data

(60) Provisional application No. 61/416,782, filed on Nov. 24, 2010.

(51) Int. Cl.
| | |
|---|---|
| C08J 3/20 | (2006.01) |
| C08K 3/00 | (2006.01) |
| C08L 23/06 | (2006.01) |
| C04B 26/12 | (2006.01) |
| C08K 3/10 | (2006.01) |
| C08G 73/10 | (2006.01) |
| C08K 3/32 | (2006.01) |

(52) U.S. Cl.
USPC ............ 524/586; 524/408; 524/409; 524/414

(58) Field of Classification Search
USPC .................. 524/432, 408, 409, 414, 586
See application file for complete search history.

(56) References Cited

U.S. PATENT DOCUMENTS

| | | | | |
|---|---|---|---|---|
| 6,103,648 A | * | 8/2000 | Yi ................................... | 501/46 |
| 2005/0205290 A1 | * | 9/2005 | Pinacci et al. ............ | 174/121 A |
| 2008/0238315 A1 | * | 10/2008 | Hojo et al. ..................... | 313/582 |
| 2008/0238821 A1 | * | 10/2008 | Miyata et al. ................... | 345/60 |

OTHER PUBLICATIONS

Catalyzing Carbonization of Polypropylene Itself by Supported Nickel Catalyst during Combustion of Polypropylene/Clay Nanocomposite for Improving Fire Retardancy Chem. Mater., 2005, vol. 17, No. 11, pp. 2799-2802.
Combination of Carbon Nanotubes with Ni2O3 for Simultaneously Improving the Flame Retardancy and Mechanical Properties of Polyethylene, J. Phys. Chem. C 2009, vol. 113, No. 30, pp. 13092-13097.
Influences of Catalysis and Dispersion of Organically Modified Montmorillonite on Flame Retardancy of Polypropylene Nanocomposites, J. App. Poly. Sci., 2007, vol. 106, pp. 3488-3494.
Strengthening Carbon Deposition of Polyolefin Using Combined Catalyst as a General Method for Improving Fire Retardancy, Macromol. Rapid Commun. 2008, vol. 29, pp. 789-793.
Synergistic Effect of Supported Nickel catalyst with Intumescent Flame-Retardants on Flame Retardancy and Thermal Stability of Polypropylene, Journal of App Polymer Science, 2006, vol. 102, pp. 5988-5993.

* cited by examiner

*Primary Examiner* — Angela C Scott
(74) *Attorney, Agent, or Firm* — Russell S. Magaziner

(57) ABSTRACT

A material is disclosed having improved flame retardant properties and is particularly applicable as a jacket for a fiber optic cable. The material is comprised of a polymeric base compounded with a vanadium phosphate glass composition. The polymeric base may be a flame retardant polyethylene and the vanadium phosphate glass composition contains vanadium oxide, phosphorus oxide and antimony oxide. The material achieves a V-0 rating when tested per Underwriters Laboratory test UL-94 and has a heat release rate value consistent with a self extinguishing material when combusted.

18 Claims, No Drawings

FLAME RETARDANT CABLE JACKET MATERIALS INCLUDING VANADIUM PHOSPHATE

PRIORITY APPLICATION

This application claims the benefit of priority under 35 U.S.C. §119 of U.S. Provisional Application No. 61/416,782, filed on Nov. 24, 2010, the content of which is relied upon and incorporated herein by reference in its entirety.

BACKGROUND

This disclosure is directed toward a series of vanadium phosphate glasses that are an effective flame retardant, and more specifically, when compounded with a polyolefin, the glasses retard combustion and can reduce combustion to the point of self extinguishing of the polyolefin. The compound is useful for fabricating fire retardant plenum cables.

The recent trend toward the use of "green" materials has prompted more research in the flame retardant industry for non-halogenated materials for use in plenum cables. Halogenated flame retardants, while extremely effective, can decompose during processing and corrode processing equipment. Halogenated flame retardants may also produce gaseous hydrogen chloride, hydrogen bromide, or hydrogen fluoride during combustion, which are harmful to the environment. At present, Polyvinyl Chloride (PVC) or Teflon® based materials will pass the rigorous testing used to qualify a cable for plenum applications in the fiber optic cable industry, but at a relatively high cost.

So-called "commodity" polymers, such as polyolefins are low cost material alternatives for plenum cable jackets. Unfortunately, the polyolefin family of polymers burns very well, so developing flame retardants for commodity polymers that will pass the rigorous testing required for cable applications is exceedingly difficult. Currently, most flame retardant polyethylenes contain high levels of magnesium dihydroxide (MDH) or aluminum trihydrate (ATH). While effective for some less demanding applications, these materials will not pass testing for plenum cable jackets. In addition, ATH starts to decompose at 190° C., which limits its use to polymers with low processing temperatures.

SUMMARY

According to one aspect a flame retardant material is suitable for use as a flame retardant jacket for a cable. The flame retardant jacket is comprised of at least 40 weight percent of a polyolefin material and from about 5 weight percent to about 60 weight percent of a vanadium phosphate material. The vanadium phosphate material is comprised of vanadium oxide, phosphorus oxide and antimony oxide. The vanadium oxide ranges from about 40 weight percent to about 75 weight percent. The phosphorus oxide ranges from about 10 weight percent to about 35 weight percent and the antimony oxide ranges from about 2 weight percent to about 30 weight percent.

According to another aspect, a method of making a flame retardant material for use as a jacket of a cable comprises: (a) preparing a mixture comprising a predetermined amount of vanadium oxide, a predetermined amount of amount of antimony oxide and a predetermined amount of phosphorus oxide; (b) heating the mixture to a temperature of from about 850° C. to about 1000° C. that is sufficient to melt the mixture; (c) quenching the melt to form a glass; (d) milling the glass to produce glass particles; and (e) compounding the glass particles with a polymeric material to produce the flame retardant material such that the resulting compound has from about 5 weight percent to about 60 weight percent glass particles.

Additional features and advantages are set forth in the detailed description which follows, and in part will be readily apparent to those skilled in the art from that description or recognized by practicing the embodiments described herein.

DETAILED DESCRIPTION

Conventional designs of fiber optic cable may have a jacket material that provides for low smoke and flame spread. Examples of jacket materials include filled PVC formulations and fluoropolymer materials. Typically, the jacket surrounds a core of twisted conductor pairs and/or data carrying cables with each cable individually insulated with a material having a low dielectric constant and a low dissipation factor.

Fiber optic cable jackets should exhibit a high level of flame retardant (FR) performance. Many such cables are used in enclosed spaces, such as air space above suspended ceilings in office buildings, where excessive smoke or fire spread could pose a significant hazard. A fiber optic cable's FR performance may in part depend upon the entire cable design and especially upon the materials selected for the jacket, the insulated conductors, and any core tapes or separator components. Jackets for cables intended for such applications are specifically required to pass a flame test, UL-94, specified by Underwriters Laboratories Inc. (UL), and it is desired that the compound have a V-0 rating. Additionally, the cable jacket should have a minimum heat release rate (HRR). The HRR is determined by testing the jacket material using a micro calorimetry technique and is a measure of how quickly the material will burn. Microcalorimetry is a versatile technique for studying the thermal activity of chemical and/or physical processes in terms of heat, heat flow and heat capacity. Generally, a material having an HRR of less than about 400 Joules per gram per degree Kelvin (J/(g-K)) is indicative of slow burn, and an HRR of less than about 200 J/g-K is necessary for a material to self extinguish.

UL test UL-94 is done according to a standard Underwriter's Lab procedure and, briefly described, samples are rated based on criteria outlined in the procedure including burn time after flame application, dripping, and smoke. According to UL-94 test procedures, a specimen is supported in a vertical position and a flame is applied to the bottom of the specimen. The flame is applied for ten seconds and then removed until flaming stops, at which time the flame is reapplied for another ten seconds and then removed. In order for a specimen to achieve a rating of V-0, the following criteria must be met: specimens must not burn with flaming combustion for more than 10 seconds after either test flame application; total flaming combustion time must not exceed 50 seconds for each set of 5 specimens; specimens must not burn with flaming or glowing combustion up to the specimen holding clamp; specimens must not drip flaming particles that ignite the cotton; and specimen can not have glowing combustion remain for longer than 30 seconds after removal of the test flame.

The present disclosure is directed to a series of vanadium phosphate glasses that are compounded with a polymeric material, or base, to produce a material having improved flame retardant properties. The material has particular application in the field of polymer jackets for use in fiber optic cable configurations, such as plenum cables. Although disclosed primarily within the context of a polymer jacket for a fiber optic cables, the skilled artisan will recognize that the principles of the present disclosure are not so limited but extend to any type of jacketed cable or other jacket requiring flame retardant properties.

The term "polymer" or "polymeric," as used herein, means a macromolecular compound prepared by polymerizing monomers of the same or different type. "Polymer" will be understood by one of skill in the art to include homopolymers, copolymers, terpolymers, interpolymers, and so on. The term "interpolymer" means a polymer prepared by the polymerization of at least two types of monomers or comonomers. It includes, but is not limited to, copolymers (which usually refers to polymers prepared from two different types of monomers or comonomers, although it is often used interchangeably with "interpolymer" to refer to polymers made from three or more different types of monomers or comonomers), terpolymers (which usually refers to polymers prepared from three different types of monomers or comonomers), tetrapolymers (which usually refers to polymers prepared from four different types of monomers or comonomers), and the like. The terms "monomer" or "comonomer" may be used interchangeably, and they refer to any compound with a polymerizable moiety which is added to a reactor in order to produce a polymer.

The jacket material discussed herein is essentially comprised of two components. The first component is a polymeric material that functions as a base material. Flame retardant additives are mixed or compounded with the base material to produce a superior jacket material with respect to retarding combustion. The second component is a flame retardant additive. As disclosed, the flame retardant additive is a vanadium phosphate material, preferably a glass composition. Details of both the polymeric base material and the vanadium phosphate glass compositions are discussed in detail below.

Polymeric Base

The materials evaluated for use as the polymeric base of the jacket material were ultimately selected from the polyolefin family. Useful polyolefins may include low density homopolymers of ethylene made by high pressure processes (HP-LDPEs), linear low density polyethylenes (LLDPEs), very low density polyethylenes (VLDPEs), ultra low density polyethylenes (ULDPEs), medium density polyethylenes (MDPEs), high density polyethylene (HDPE), and metallocene copolymers.

An HDPE powder material used and evaluated as described herein was supplied from Icoflow of Houston, Tex. The HDPE polymer was used as a screening tool for a variety of low melting glasses, including the vanadium phosphate glasses disclosed herein. All glasses were compounded and injection molded at 60 weight percent (wt %) with the HDPE polymer. Good compatibility and dispersion was observed from scanning electron microscope images taken from the 60 wt % Sample 1 glass and 40 wt % HDPE powder. The HDPE polymer was able achieve a 120% elongation at break, which was a strain requirement for all cable material compounds to be manufactured into cable jackets.

Of the polyolefins considered for polymeric materials, commercially available flame retardant polyethylene (FRPE) samples were evaluated for use. Samples included the following FRPE's: (1) Alpha Gary's Megalon 8553™; (2) Megalon 8142™; (3) S&E Specialty Polymers FRPE (S&E); (4) AFR/12 (Solvay Pandaplast); and (5) CCS formulation Condor 2Y141. These materials were all able achieve a 120% elongation at break, as required. The flame retardant capabilities were evaluated and tested subject to the UL-94 test and an HRR for each material was calculated using microcalorimetry methods. All materials achieved a UL-94 rating of V-0 and the results of both the UL-94 testing and the microcalorimetry testing are listed in Table 1 below. Of the materials tested, S&E Specialty Polymers FRPE performed well and achieved the UL-94 V-0 rating but had the highest HRR value. The reason for S&E Specialty Polymers FRPE having a large HRR value may be because S&E Specialty Polymers FRPE contains an intumescent agent, which typically will not show any effect during forced combustion.

TABLE 1

| Material | UL-94 V-0 | HRR peak J/g-K |
|---|---|---|
| Alpha Gary's Megolon 8553 | Yes | 200.7 |
| Alpha Gary's Megalon 8142 | Yes | 277.8 |
| S&E Specialty Polymers FRPE | Yes | 460 |
| Solvay Pandaplast AFR/12 | Yes | 349.4 |
| CCS formulation Condor 2Y141 | Yes | 367.6 |

Vanadium Phosphate Glass

A plurality of phosphate glass compositions were evaluated to determine their use as a viable flame retardant additive with the polymeric base. The compositions were melted, quenched to glass, milled, and compounded for testing. The glass compositions evaluated are presented below in Table 2. Some glasses were formulated with relatively narrow glass stability windows to test a hypothesis that during combustion the glass would melt, flow, and ceram to protect the underlying polymer. Other glasses were formulated with known flame retardant materials, such as tungsten, molybdenum, and fluorine. Still other glasses were formulated to incorporate first row transition metals (i.e. titanium and iron). These glasses were produced to test another hypothesis that the first row transition metals would preferentially oxidize during combustion and remove oxygen from the combustion process.

The glasses used for testing as flame retardant additives were prepared using standard crucible melting techniques. Appropriate amounts of raw materials were weighed, mixed and then loaded into crucibles which were then placed into a furnace operating at 700-1000° C. for a time period sufficient to convert the solid batch into a homogenous melt, typically on the order of 30 min to 2 hr. The crucibles were then removed from the furnace and the melt was then quenched to a glass via rapid cooling. By way of example, a 500 gm quantity of sample 1 (See Table 2) was made as follows. 197 gm of phosphoric acid ($H_3PO_4$) were poured into a 1800 cc quartz crucible. 338 gm of vanadium oxide ($V_2O_5$) and 41.8 gm of antimony oxide ($Sb_2O_3$) were then mixed. The latter mixture was then gradually added to the quartz crucible containing the previously measured amount of phosphoric acid. The resultant suspension was stirred to make a homogeneous slurry. The crucible was then covered with a silica lid and transferred to a furnace operating at 1000° C., held there for 2 hr, and then removed to quench the melt by pouring onto a steel plate. It should be noted that alternative raw materials that would ultimately yield the same nominal composition can be used. For example, in the previous case, the required amount of phosphorus oxide can be provided by about 122 gm of phosphorus pentoxide ($P_2O_5$). In similar fashion, glasses such as samples 4 or 8 (See Table 2) can be prepared from mixtures in which a portion of the phosphorus oxide is batched as either iron phosphate ($FePO_4$) or sodium metaphosphate ($NaPO_3$).

TABLE 2

| | | \multicolumn{8}{c}{SAMPLE NUMBER} | | | | | | | |
|---|---|---|---|---|---|---|---|---|---|
| | | 1 | 2 | 3 | 4 | 5 | 6 | 7 | 8 |
| OXIDES (Weight Percent) | $V_2O_5$ | 67.4 | 60.9 | 71.3 | 70.0 | 71.7 | 60.9 | 53.1 | 43.5 |
| | $Sb_2O_3$ | 8.31 | 26.3 | 3.07 | 0 | 0 | 6.81 | 5.01 | 2.79 |
| | $P_2O_5$ | 24.3 | 12.8 | 25.7 | 25.2 | 25.8 | 26.5 | 29.3 | 32.6 |
| | $TiO_2$ | 0 | 0 | 0 | 0 | 2.42 | 0 | 0 | 0 |
| | ZnO | 0 | 0 | 0 | 0 | 0 | 3.8 | 8.39 | 14.01 |
| | $Fe_2O_3$ | 0 | 0 | 0 | 4.73 | 0 | 0 | 0 | 0 |
| | $Na_2O$ | 0 | 0 | 0 | 0 | 0 | 1.93 | 4.25 | 7.1 |
| UL-94 V-0 Rating | | Yes | Yes | Yes | Yes | Yes | Yes | No | Yes |
| Microcalorimetry (J/gK) compounded at 60 wt % with HDPE | | 380 | 391 | 379 | 385 | 378 | 376 | 397 | 382 |
| Microcalorimetry (J/gK) compounded at 5 wt % with FRPE | | 207 | NA | NA | NA | NA | NA | NA | NA |

Table 2 provides a summary of the composition of the glasses that were tested and evaluated as well as the results of the testing. The weight percent of each of the oxide components that each sample comprises is listed below the sample number and the oxides themselves are listed in the column to the left of the Sample 1 column. For example, Sample 1 comprises 67.4 wt % vanadium oxide, 8.31 wt % antimony oxide, and 24.3 wt % phosphorus oxide. It can be seen that ranges for specific oxides of the collection of compositions exists. For the above samples evaluated, vanadium oxide ranges from about 43 wt % to about 72 wt %, antimony oxide ranges from about 2.75 wt % to about 26.5 wt %, phosphorus oxide ranges from about 12.5 wt % to about 42.5 wt %, titanium oxide ranges from 0.0 wt % to about 2.5 wt %, zinc oxide ranges from about 0 wt % to about 26.5 wt %, iron oxide ranges from about 0 wt % to about 4.75 wt % and sodium oxide ranges from about 0 wt % to about 7.5 wt %.

Ranges for the individual glass constituents are also known. A glass composition as disclosed herein may containing between 40 wt % to 75 wt % of vanadium oxide, preferably between 55 wt % to 75 wt % of vanadium oxide and more preferably between 65 wt % to 70 wt % of vanadium oxide. A glass composition as disclosed herein may contain between 10 wt % to 35 wt % of phosphorous oxide, preferably between 10 wt % to 30 wt % of phosphorous oxide and more preferably between 20 wt % to 30 wt % of phosphorous oxide. A glass composition as disclosed herein may contain between 2 wt % to 27 wt % of antimony oxide, preferably between 2 wt % to 20 wt % of antimony oxide and more preferably between 6 wt % to 10 wt % of antimony oxide. A glass composition disclosed herein may contain 1 wt % to 10 wt % of a transition metal oxide. A transition metal oxide will be understood by the skilled artisan to at least include the oxides of titanium, chromium, manganese, cobalt, nickel, copper, niobium, iron, molybdenum and tungsten. A glass composition as disclosed herein may contain between 1 wt % to 10 wt % alkali metal oxide and 1 wt % to 20 wt % zinc oxide. An alkali metal oxide will be understood by the skilled artisan to at least include the oxides of lithium, sodium, potassium, rubidium and cesium.

Preparation of the Glass Samples

All glass samples tested were ball milled to 5 microns and compounded with polymers at various loadings using an 18 mm twin screw extruder, and injection molded for testing. Testing was limited to two industry standards; microcalorimetry and UL-94 vertical burn testing. However, over the course of 5 rounds of testing, glass samples containing vanadium showed the most improvement in HRR. All tested samples included an inorganic component and an organic component so that proper mixing was essential. The co-rotating 18 mm twin screw extruder with extra shear-inducing elements (for improved mixing and uniform extruding) was used for compounding the glass powder with one or more organic components. Once the compositions were extruded, they were pelletized and dried for several hours. Finally, injection molded samples were prepared in order to meet the criteria according to the ASTM D638 standard.

Vanadium Glass Compositions

Samples 1 and 2 were compounded at 60 wt % with 40 wt % of a high density polyethylene (HDPE) and molded into UL-94 samples for testing. The HRR for Sample 1 compounded with HDPE and the HRR for Sample 2 compounded with HDPE, as measured by microcalorimetry testing, were approximately 380 J/g-K and 391 J/g-K, respectively. These values represent about a 20% reduction in the HRR of the pure HDPE polymer. Although this amount of reduction had not been seen in previous samples, the values were not thought low enough for the samples to self extinguish, which was desired. Surprisingly, when Samples 1 and 2 were tested to UL-94, both samples rated V-0 and had a minimal burn time and produced no smoke. An investigation followed into the use of vanadium phosphate glasses as single ingredient flame retardant agents with the polymeric base.

Alternative Vanadium Glass Compositions

Alternate glass formulations were produced and evaluated to determine the effect of glass composition on FR activity. Vanadium glass compositions were formulated with 4.73 wt % Iron Oxide (Sample 4) or 2.42 wt % Titanium Oxide (Sample 5) substituted for the Antimony in Sample 1. Additional formulations were tested that contained a reduced amount of vanadium. Sample 6, which contained 60.9 wt % vanadium, Sample 7, which contained 53.09 wt % vanadium and Sample 8, which contained 43.5 wt % vanadium were prepared. All glasses were ball milled and compounded at 60 wt % with 40 wt % HDPE. All samples but Sample 7 rated V-0 during UL-94 testing, which, despite failure, did show signs of FR activity. However, Sample 7 did achieve the V-0 rating when a hotter flame was used for testing (980° C. propane torch versus 500° C. for standard UL-94 testing).

Results

As discussed above, the jacket material compositions disclosed herein were evaluated with respect to two test methods, UL-94 and microcalorimetry. In order for a material to meet the established acceptance criteria, a material should have a V-0 rating when evaluated using the UL-94 test and an HRR value, as determined via microcalorimetry, ranging from about 200 J/g-K to about 300 J/g-K. It was preferred that the HRR value for the jacket material be closer to the 200 J/g-K limit to ensure that the material would self extinguish.

Table 1 provides UL-94 test results and HRR data calculated via microcalorimetry testing for FRPE polymers evaluated. It is seen that all of the FRPE polymers received the V-0 rating as determined from the UL-94 test. The HRR values range from 200.7 J/g-K to 460 J/g-K. The S&E Specialty Polymers FRPE was not a candidate for further evaluation because of the higher HRR value (greater than 400 J/g-K).

The UL-94 test results and the HRR numbers determined from microcalorimetry are presented in Table 2 for Samples 1-8. Samples 1-8 were compounded at 60 wt % with an HDPE polymer at 40 wt %. Samples 1-6 and 8 all achieved a V-0 rating according to the UL-94 test. However, the HRR values were still high and ranged from about 375 J/g-K to about 400 J/g-K.

In an effort to reduce the HRR value, a first jacket test material was produced with the glass composition of Sample 1 being compounded at 5 wt % with the FRPE polymeric base Megalon 8142™. The jacket material was evaluated using both the UL-94 test method and determining the HRR via microcalorimetry. The results of the UL-94 testing for this composition showed no burn time (i.e. the composition did not burn and met the V-0 rating). Neat FRPE (i.e. a sample of the FRPE material only) burned for about 9 seconds. This indicated that when the Sample 1 glass was compounded at 5 wt % with 95 wt % of the FRPE, superior FR characteristics were achieved. Microcalorimetry results for the neat FRPE yielded an HRR value of about 278 J/g-K, which is above the 200 J/g-K self extinguishing limit. Microcalorimetry results for the composition of Sample 1 compounded at 5 wt % with 95 wt % of the FRPE indicated that the addition of the 5 wt % vanadium glass composition caused the HRR value to be reduced by about 25% to about 207 J/g-K as compared to the neat FRPE. An HRR value of about 207 J/g-K is within the acceptable deviation of the 200 J/g-K self extinguishing limit.

A second jacket material was produced and tested. The second jacket material had a composition of 10 wt % of glass having the composition of Sample 1 compounded with 90 wt % of the FRPE. This composition further reduced the HRR value. The HRR value was reduced by 28% when compared with the HRR value of the neat FRPE. Thus, it was concluded that glass having the composition of Sample 1 being compounded with an FRPE is effective in boosting the FR activity of a commercial product.

It was thus concluded that vanadium phosphate glasses having the compositions of Samples 1-3 provided optimum concentrations of vanadium oxide, phosphorus oxide and antimony oxide. Further, it was determined that about 3 wt % to 20 wt % of vanadium phosphate glass compounded with about 80 wt % to 97 wt % of the FRPE Megalon 8142™ for use as a jacket material produced beneficial results based on the desired outcome of the jacket material achieving a V-0 rating when tested to the UL-94 standard and a HHR value of approximately 200 J/g-K. Compounding about 4 wt % to 11 wt % of vanadium phosphate glass with about 89 wt % to 96 wt % of the FRPE Megalon 8142™ produced superior results.

Throughout the foregoing disclosure, the adjective "about" has been used in numerous locations preceding an amount. Other embodiments of this disclosure are like the above-discussed embodiments, except that the adjective "about" is optional and may be omitted.

It will be apparent to those skilled in the art that various modifications and variations of the above described preferred embodiments can be made without departing from the spirit or scope of the invention. Some of these variations may include, but would not be limited to, vanadium phosphate crystalline materials, vanadium metal oxides, and other transition metal complexes such as oxides of chromium, manganese, iron, cobalt, nickel, copper, zinc, niobium and molybdenum, to name but a few.

We claim:

1. A flame retardant cable jacket material, comprising:
at least 40 weight percent of a polyolefin material; and
from 5 weight percent to 60 weight percent of a vanadium phosphate material, wherein the vanadium phosphate material comprises from 40 weight percent to 75 weight percent of vanadium oxide.

2. The material of claim 1, wherein the vanadium phosphate material comprises from 10 weight percent to 35 weight percent of an oxide of phosphorus.

3. The material of claim 2, wherein the vanadium phosphate material further comprises at least one material selected from the group of materials consisting of: from 2 weight percent to 27 weight percent of antimony oxide, from 1 to about 10 weight percent of a transition metal oxide, from 1 weight percent to 10 weight percent of alkali metal oxide and from about 1 weight percent to about 20 weight percent of zinc oxide.

4. The material of claim 3, wherein the transition metal oxide is selected from the group of transition metal oxides consisting of: titanium, chromium, manganese, cobalt, nickel, copper, niobium, iron, molybdenum and tungsten.

5. The material of claim 3, wherein the alkali metal oxide is selected from the group of alkali metal oxides consisting of: lithium, sodium, potassium, rubidium and cesium.

6. The material of claim 3, wherein a heat release rate of the cable jacket material is less than 300 J/g-K.

7. The material of claim 3, wherein the vanadium phosphate material comprises:
from 2 to 27 weight percent of antimony oxide,
from 1 to about 10 weight percent of a transition metal oxide,
from 1 to 10 weight percent of alkali metal oxide, and
from about 1 to about 20 weight percent of zinc oxide.

8. The material of claim 3, wherein the vanadium phosphate material comprises:
65 to 70 weight percent of vanadium oxide,
20 to 30 weight percent of an oxide of phosphorus, and
6 to 10 weight percent of antimony oxide.

9. The material of claim 2, wherein the vanadium phosphate material is comprised of 55 weight percent to 75 weight percent of vanadium oxide, 10 weight percent to 30 weight percent of the oxide of phosphorus and 2 weight percent to 20 weight percent of antimony oxide.

10. The material of claim 2 where the vanadium phosphate material is comprised of 65 weight percent to 70 weight percent of vanadium oxide, 20 weight percent to 30 weight percent of the oxide of phosphorus and 6 weight percent to 10 weight percent of antimony oxide.

11. The material of claim 2, wherein the vanadium phosphate material comprises a glass material.

12. The material of claim 11, wherein the vanadium phosphate material is ball milled to a particle size of about 5 microns.

13. The material of claim 2, wherein the cable jacket material comprises about 90 weight percent of the polyolefin material and about 10 weight percent of the vanadium phosphate material.

14. The material of claim 2, wherein the cable jacket material comprises about 95 weight percent of the polyolefin material and about 5 weight percent of the vanadium phosphate material.

15. The material of claim 2, wherein the polyolefin material is a polyethylene material.

16. The material of claim 15, wherein a heat release rate of the cable jacket material is less than 300 J/g-K.

17. A flame retardant cable jacket material, comprising:
at least 40 weight percent of a polyolefin material, wherein the polyolefin material is a polyethylene material; and
from 5 weight percent to 60 weight percent of a vanadium phosphate material, wherein the vanadium phosphate material is comprised of:
65 to 70 weight percent of vanadium oxide,
20 to 30 weight percent of an oxide of phosphorus, and
6 to 10 weight percent of antimony oxide.

18. The material of claim 17, wherein a heat release rate of the cable jacket material is less than 300 J/g-K.

* * * * *